UNITED STATES PATENT OFFICE.

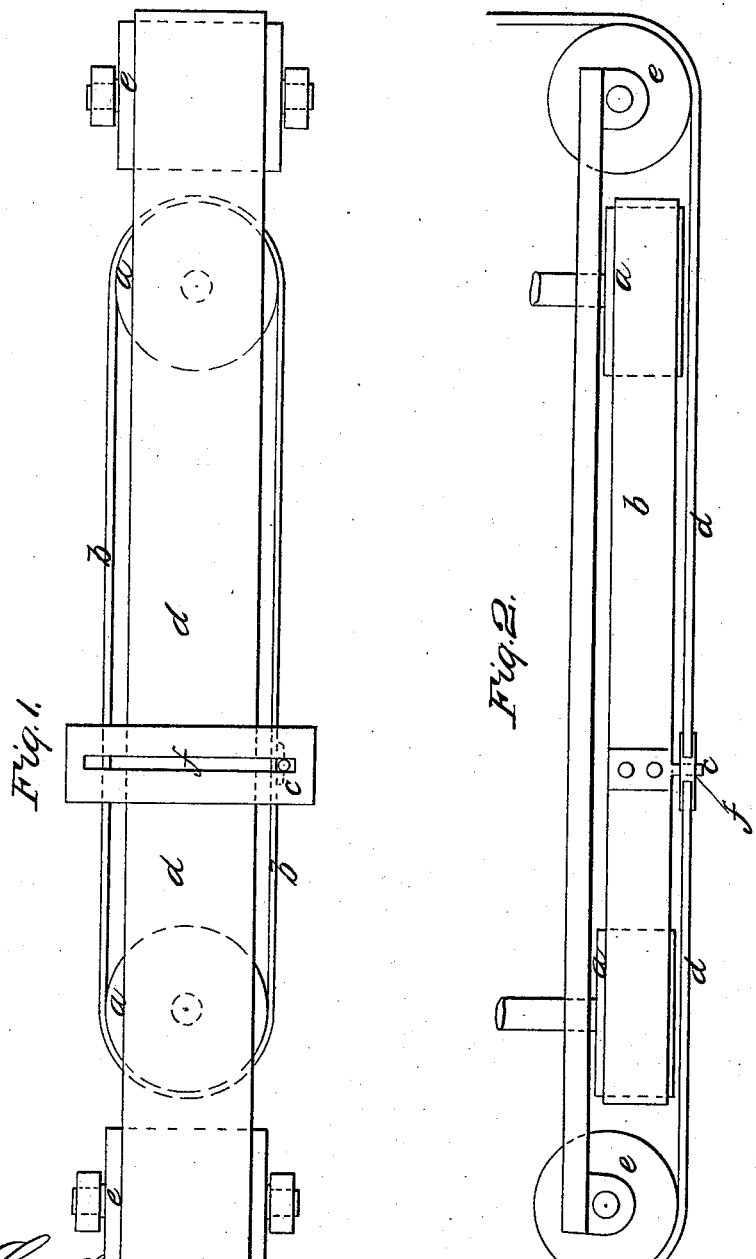

JOHN W. DRUMMOND, OF NEW YORK, N. Y.

IMPROVED MODE OF CONVERTING MOTION.

Specification forming part of Letters Patent No. 41,835, dated March 8, 1864.

*To all whom it may concern:*

Be it known that I, JOHN W. DRUMMOND, of the city and State of New York, have invented, made, and applied to use a certain new and useful Improvement in Converting Rotary into Reciprocating Motions; and I do hereby declare the following to be a full, clear, and exact description of the said invention, reference being had to the annexed drawings, making part of this specification, wherein—

Figure 1 is a side view of my said improvement, and Fig. 2 is a plan of the same.

Similar marks of reference denote the same parts.

Crank-pins have heretofore been made to travel in a straight slot and communicate to the devices connected with such slot a reciprocating movement; but such slots required to be as long as the diameter of the circle described by the revolution of the crank-pin, and the extent of reciprocating motion is limited to such diameter.

The motion given by a crank in communicating a reciprocating motion to any device connected to it is especially adapted to many purposes, because the movement is gradually stopped and started, thereby preventing sudden concussion.

The nature of my said invention consists in a crank-pin attached to and traveling with an endless belt around a pair of pulleys and taking a slot in the article to which reciprocation is to be communicated. Thereby the motion given by the crank-pin can be of any desired length, according to the length of the endless belt, and the crank-pin in turning the pulleys acts to stop and start the article reciprocated in the same manner as a crank-pin on an arm—viz., gradually and without concussion In the drawings, *a a* are a pair of wheels or pulleys, of any desired kind or size, mounted on shafts or gudgeons, and propelled by competent power applied to one of the pulleys in any convenient manner.

*b* is a belt, of leather or other material, or a flat chain may be substituted. *c* is the crank-pin attached to such belt and projecting beyond one side of the belt.

*d* is the article to be reciprocated, which I have represented as a belt guided by the rollers *e e*, so that it will reciprocate in a plane parallel to the pulleys *a a*.

*f* is a cross-slot formed in *d*, in which the crank-pin *c* travels and communicates the reciprocation in the manner before mentioned.

This device may be applied to any desired purpose in the arts where a reciprocating movement is required.

What I claim, and desire to secure by Letters Patent, is—

The combination of a belt and crank-pin with a pair of pulleys or wheels, and a cross-slot for producing a reciprocating movement, as specified.

In witness whereof I have hereunto set my signature this 21st day of October, A. D. 1863.

JOHN W. DRUMMOND.

Witnesses:
LEMUEL W. SERRELL,
THOS. GEO. HAROLD.